(12) United States Patent
Ademe

(10) Patent No.: US 11,533,946 B2
(45) Date of Patent: Dec. 27, 2022

(54) SYSTEMS AND METHODS FOR DETERMINING A CHARACTERISTIC OF A SMOKING ARTICLE

(71) Applicant: R. J. Reynolds Tobacco Co., Winston-Salem, NC (US)

(72) Inventor: Balager Ademe, Winston-Salem, NC (US)

(73) Assignee: R. J. Reynolds Tobacco Co., Winston-Salem, NC (US)

(*) Notice: Subject to any disclaimer, the term of this patent is extended or adjusted under 35 U.S.C. 154(b) by 227 days.

(21) Appl. No.: 16/907,898

(22) Filed: Jun. 22, 2020

(65) Prior Publication Data

US 2021/0392945 A1 Dec. 23, 2021

(51) Int. Cl.
*A24C 5/34* (2006.01)
*G01N 22/02* (2006.01)
*G01N 22/00* (2006.01)

(52) U.S. Cl.
CPC .......... *A24C 5/3412* (2013.01); *G01N 22/00* (2013.01); *G01N 22/02* (2013.01); *G01N 2223/052* (2013.01); *G01N 2223/601* (2013.01); *G01N 2223/621* (2013.01); *G01N 2223/646* (2013.01)

(58) Field of Classification Search
CPC ...... A24C 5/3412; G01N 22/00; G01N 22/02; G01N 2223/052; G01N 2223/601; G01N 2223/621; G01N 2223/646
See application file for complete search history.

(56) References Cited

U.S. PATENT DOCUMENTS

2016/0120213 A1 5/2016 Ademe et al.

FOREIGN PATENT DOCUMENTS

| DE | 102018127924 A1 | 5/2019 | |
|---|---|---|---|
| EP | 2146198 A2 | 1/2010 | |
| WO | WO-02097411 A1 * | 12/2002 | ............. G01N 22/04 |
| WO | WO-2019073214 A1 * | 4/2019 | ........... A24C 5/1871 |

OTHER PUBLICATIONS

World Intellectual Property Office, International Search Report, dated Sep. 3, 2021.

* cited by examiner

*Primary Examiner* — Mark R Gaworecki
(74) *Attorney, Agent, or Firm* — Womble Bond Dickinson (US) LLP; Chris Humphrey; John V. Forcier

(57) ABSTRACT

Testing systems and methods are provided for a smoking article to determine a characteristic of the smoking article, such as density of a material used therewith. The testing system may include a test fixture and an electromagnetic energy generating device The testing methods may be carried out by subjecting the material to the electromagnetic energy and determining the amount of energy absorbed by the material.

21 Claims, 3 Drawing Sheets

SYSTEMS AND METHODS FOR DETERMINING A CHARACTERISTIC OF A SMOKING ARTICLE

FIELD OF THE DISCLOSURE

The present disclosure relates generally to products, such as smoking articles intended for human consumption; and more particularly, to methods and systems for testing the products to determine a characteristic of the product.

BACKGROUND

Popular smoking articles, such as cigarettes, have a substantially cylindrical rod-shaped structure and include a charge, roll or column of smokable material, such as shredded tobacco (e.g., in cut filler form), surrounded by a paper wrapper, thereby forming a so-called "smokable rod", "tobacco rod" or "cigarette rod." Descriptions of cigarettes and the various components thereof are set forth in Tobacco Production, Chemistry and Technology, Davis et al. (Eds.) (1999); which is incorporated herein by reference. A traditional type of cigarette is employed by a smoker by lighting one end thereof and burning the tobacco rod. The smoker then receives mainstream smoke into his/her mouth by drawing on the opposite end (e.g., the filter end or mouth end) of the cigarette. E-cigarettes can be similarly structured; however, the tobacco is heated as opposed to burned and is typically circumscribed by a heat conductive material, such as a foil. Descriptions of e-cigarettes and the various components thereof can be found in U.S. Pat. Nos. 7,726,320; 9,078,473; 9,220,301; 10,226,073; and 10,314,334, the entire disclosures of which are hereby incorporated by reference herein.

During manufacture of such smoking articles, certain quality control testing is carried out to identify certain defects that may be encountered during manufacture. For example, the tobacco rod section may have a low weight/density, a high weight/density, a soft spot, a hard spot, loose tobacco about one end of the tobacco rod section, and/or an improper density profile along the length of the tobacco rod section. Traditional cigarette quality control testing to determine a particular characteristic thereof was typically carried out on a substantially complete cigarette, or at least a substantially complete tobacco rod section. Unfortunately, if a defect was detected the substantially complete cigarette would have to be scrapped, resulting in significant waste. In some cases, for example, a method of determining a density or water content of the tobacco within the cigarette, or at least the tobacco rod section, involves passing electromagnetic energy through the cigarette and measuring the exiting energy. However, because of the nature of certain types of smoking articles, it is typically not possible to transmit electromagnetic energy therethrough.

BRIEF SUMMARY

The disclosed methods and associated apparatus provide for inspecting certain types of smoking articles and identifying any defective components thereof at an earlier stage during the manufacture thereof to reduce waste. In particular, the present disclosure relates to methods and apparatus for determining a characteristic of a smoking article, or component thereof, such as heat not burn (HNB) substrates for aerosol delivery devices in order to provide an inhalable substance in the form of an aerosol for human consumption. Generally, the use of expanded tobacco is known for such substrates and tobacco rod sections. However, when the density of the substrate material or tobacco material (collectively "material") is below a certain level, the firmness and integrity thereof can become unacceptable.

The disclosure is described herein with respect to a characteristic of a smoking article, such as weight, density, water content, etc.; however, the disclosure is primarily concerned with measuring the density of a material, such as a tobacco material or an aerosol generating substrate material, for use within a particular type of smoking article, such as HNB substrates. Various examples of materials for use in a smoking article are disclosed hereinbelow. Generally, density is a physical parameter that plays a vital and important role in all material states, whether solid, liquid, or gaseous. It is measured throughout various industries to gain insight into materials, for example their purity, concentration of components, and composition. The density (and concentration) of certain products has a great impact on their quality, behavior, and use.

The term "density" (e.g., substrate density or material density) typically refers to the mass of the substrate or material, such as a tobacco material (measured in grams) per unit volume of substrate or rod (expressed as $cm^3$). However, density can also be reported in several different units, such as kilogram per cubic meter ($kg/m^3$), kilogram per liter ($kg/L$), gram per liter ($g/L$), or converted into a concentration value.

The term "smoking article" is not limited to combustible smoking articles, but is intended to include, for example, various aerosol delivery devices that use, for example, electrical energy, a chemical reaction, or a carbonaceous fuel element to heat a material (preferably without combusting the material to any significant degree) to form an inhalable substance for human consumption. The aerosol-forming material may include a tobacco or tobacco derived substance and/or other substances, such as those disclosed hereinbelow.

In one aspect, the disclosure relates to a method of determining a characteristic of a smoking article. The method includes providing at least a portion of the smoking article to a test fixture, transmitting electromagnetic energy from an energy generating device to the at least a portion of the smoking article, and measuring an amount of electromagnetic energy reflected from at least one of the at least a portion of the smoking article or a portion of the test fixture to determine an amount of electromagnetic energy absorbed by the at least a portion of the smoking article, wherein the amount of electromagnetic energy absorbed represents the characteristic. The test fixture is located proximate the electromagnetic energy generating device. In some embodiments, the at least a portion of the smoking article includes a reflective surface; however, in alternative embodiments, the test fixture includes a platform for receiving the smoking article and the platform can additionally or alternatively be the portion of the test fixture that provides the reflective surface. In various embodiments, the reflective surface may include, for example, a metallic material (e.g., a foil wrap about a substrate material or an aluminum platform). Other materials may be selected to suit a particular application (e.g., electromagnetic energy wavelengths used, type of detector, sensitivity of the detector, etc.) and may also include a glass/mirror material. In various embodiments, the electromagnetic energy generating device and the detector may be calibrated based on the reflective material being used and/or the type or composition of material being characterized. In some embodiments, the characteristic to be determined is the density of a material to be used in the smoking article, such as a tobacco material or a substrate material, examples of which are described hereinbelow.

In various embodiments, the device for generating electromagnetic energy generates microwave radiation. As a general matter, microwaves are a form of electromagnetic radiation with wavelengths ranging from about one (1) meter to about one (1) millimeter, with frequencies between 300 MHz (1 m) and 300 GHz (1 mm). This definition of microwaves includes both ultra-high frequencies (UHF) and extremely high frequencies (EHF) (millimeter wave) bands. In some cases, the range is between 1 and 100 GHz (wavelengths between 0.3 m and 3 mm). In all cases, microwaves include the entire super high frequency (SHF) band (3 to 30 GHz, or 10 to 1 cm) at minimum. The microwave energy can be generated via at least one of a magnetron, a klystron, a Gunn oscillator, or a gyrotron. A magnetron is relatively inexpensive and it can generate a large amount of power, however, the particular source of the microwaves will be selected to suit a particular application. In some embodiments, the source may be, for example, a fixed frequency Gunn oscillator as may be obtained as part number ZFF8/40/100 from ZAX Millimeter Wave Corporation of Upland, Calif.

In additional embodiments, the amount of electromagnetic energy reflected by the at least a portion of the smoking article is measured via a detector. In some embodiments, the aforementioned Gunn oscillator can also be used to detect and measure the reflected microwaves. The method may further include the step of operably engaging a controller element between the electromagnetic energy generating device and a sensing element in communication with the controller, wherein the controller is configured to selectively control the electromagnetic energy generating device to emit electromagnetic energy at a frequency specific to one or more components of the smoking article. For example, the specific frequency, or other parameter, can be determined by a sensed feature of, for example, the composition and/or dimensions of the smoking article or the testing environment. In various embodiments, the smoking article includes a substrate, such as a tobacco containing material in the form of a liquid or a solid, shredded or pelletized, etc., deposited on an outer wrap, wherein the outer wrap is in an unwrapped configuration (e.g., prior to rolling the tobacco rod or an equivalent process, such as enclosing the material). In some embodiments, the outer wrap includes the reflective surface, which can include, for example, a foil substrate or other conductive material.

In still other embodiments of the method, the step of providing the at least a portion of the smoking article to a test fixture can include the steps of removing the at least a portion of the smoking article from a production machine for a smoking article and securing the at least a portion of the smoking article to the test fixture. For example, the smoking article can be introduced to the test fixture via an opening in a housing associated with the test fixture, where the opening can be closed once the smoking article has been secured. Alternatively, the step of providing the at least a portion of the smoking article to a test fixture can include transferring the at least a portion of the smoking article to a test station within a production machine, such as, for example, those described within the references incorporated herein.

Furthermore, the test fixture can include a platform configured for receiving the at least a portion of the smoking article, where the platform may be made of a material that is impervious to (e.g., at least partially and possibly substantially reflective to) the electromagnetic energy. In some embodiments, the platform is contoured to optimize a direction in which the electromagnetic energy is reflected. For example, the platform may include a contour configured to secure the smoking article in a central region of the platform and the platform itself may be curved to direct the scattered electromagnetic radiation towards a single focal point, such as the location of the detector. A position of the detector relative to the test fixture, specifically the smoking article positioned therein, can be adjustable. In various embodiments, the test fixture includes a housing incorporating the electromagnetic energy generating device and configured to contain the electromagnetic energy within the test fixture.

In another aspect, the disclosure relates to a testing system for determining a characteristic of a smoking article. The system includes a test fixture, where the test fixture includes a platform configured for receiving at least a portion of the smoking article and a housing coupled to and substantially enclosing the platform; an electromagnetic energy generating device (such as those described herein) coupled to the housing; and a detector coupled to the housing and configured for measuring reflected electromagnetic energy. The reflected electromagnetic energy is reflected from at least one of the at least a portion of the smoking article or the platform. The at least a portion of the smoking article includes a substrate material (such as those described herein) deposited on an outer wrap, where the outer wrap is in an unwrapped configuration. The housing defines a testing environment and is configured to provide access to the platform (e.g., via a retractable door). The electromagnetic energy generating device is configured to deliver electromagnetic energy to the testing environment, where the electromagnetic energy is directed towards the at least a portion of the smoking article.

In various embodiments, the testing system is incorporated into a machine for manufacturing a smoking article. The electromagnetic energy generating device can generate microwaves via at least one of a magnetron, a klystron, a Gunn oscillator, or a gyrotron. In certain embodiments, the system further includes a controller operably engaged with the electromagnetic energy generating device and the detector. The controller can be configured to selectively control the electromagnetic energy generating device to emit electromagnetic energy at a frequency specific to one or more components of the smoking article. In some cases, the controller includes a processor or is in electrical communication therewith. The processor can be configured to determine an amount of electromagnetic energy absorbed by the at least a portion of the smoking article, where the amount of electromagnetic energy absorbed represents the characteristic. In some embodiments, the characteristic is a density of a material, such as a substrate or other tobacco containing material. In certain embodiments, the platform includes a material that is impervious to (e.g., at least partially and possibly substantially reflective to) the electromagnetic energy and is contoured to optimize a direction in which the electromagnetic energy is reflected.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure and are not intended as a definition of the limits of the disclosure. For purposes of clarity, not every component may be labeled in every drawing. In the following description, various embodiments of the present disclosure are described, by way of example only, with reference to the following drawings, in which.

DETAILED DESCRIPTION

The present disclosure will now be described more fully hereinafter with reference to example embodiments thereof. These example embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements.

Aspects and embodiments of the present disclosure may relate, for example, to smoking article production apparatus and methods, in particular, for producing substrates, such as those containing a tobacco material or other biomass and for use in a smoking articles, such as HNB and other tobacco heating products (THP), including carbon heated tobacco products (CTHP) and electrically heated tobacco products (ETHP). In a general aspect, embodiments of the present disclosure may broadly implement apparatus and methods for inspecting smoking articles and identifying any defective substrates or materials therein, at various points during the manufacturing process. Additional aspects of the present disclosure may further allow for the testing process and/or the post-testing handling of the smoking article to be automated.

As used in this specification and the claims, the singular forms "a," "an," and "the" include the plural forms unless the context clearly dictates otherwise. Reference to "dry weight percent" or "dry weight basis" refers to weight on the basis of dry ingredients (i.e., all ingredients except water). As used herein, "substantially free" refers to concentrations of a given substance of less than 1% by weight or less than 0.5% by weight or less than 0.1% by weight based on total weight of a material. Reference to percent is intended to mean percent by weight unless otherwise indicated.

Figure 1:
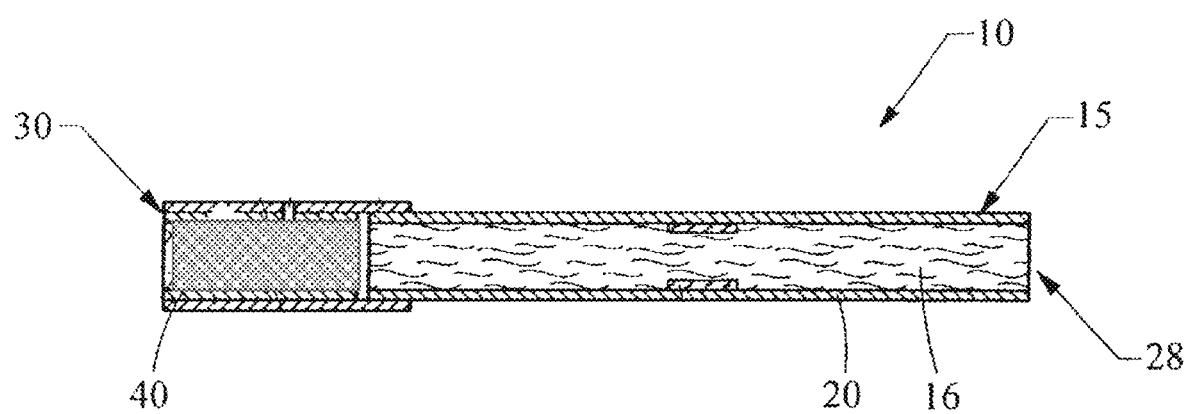
FIG. 1 schematically illustrates a representative smoking article, such as a cigarette, possessing certain representative components of a smoking article in accordance with one or more embodiments of the disclosure.

FIG. 1 illustrates a representative smoking article 10, such as, for example, a cigarette, possessing certain representative components of a smoking article. The cigarette 10 includes a generally cylindrical rod 15 of a charge or roll of smokable filler material 16, such as tobacco or a tobacco substrate, contained in a circumscribing wrapping material 20 or otherwise enclosed. The rod 15 is conventionally referred to as a "tobacco rod." In various embodiments, the tobacco rod may include a carbon tip (e.g., a CTTP product) or be electrically heated (e.g., a ETHP product). At one end of the tobacco rod 15 is positioned a filter element 30 (or a mouthpiece in the case of an e-cigarette). The filter element 30 (or mouthpiece) is typically positioned adjacent one end of the tobacco rod 15 (or substrate), such that the filter element and tobacco rod are axially aligned in a serial or end-to-end relationship. The filter element 30 (or mouthpiece) may have a generally cylindrical shape, and the diameter thereof may be essentially equal to the diameter of the tobacco rod 15. The ends of the filter element permit the passage of air and smoke therethrough. The filter element 30 includes a filter material 40. The wrapping material 20 can have a wide range of compositions and properties. The selection of a particular wrapping material will be readily apparent to those skilled in the art of cigarette design and manufacture. In the case of HNB and THP-type smoking articles, the wrapping material may also include a conductive material, such as a foil or other metallic element. Additionally, or alternatively, the smoking article 10 includes a housing enclosing the various components of an aerosol delivery device. Example types of wrapping materials, wrapping material components and treated wrapping materials are described in U.S. Pat. No. 5,220,930 to Gentry; U.S. Pat. No. 7,275,548 to Hancock et al.; and 7,281,540 to Barnes et al.; and PCT Application Pub. Nos. WO 2004/057986 to Hancock et al.; and WO 2004/047572 to Ashcraft et al.; which are incorporated herein by reference in their entireties.

In some embodiments, tobacco materials 16 may be used in forms, and in manners, that are traditional for the manufacture of smoking articles, such as cigarettes. The tobacco may be used in cut filler form (e.g., shreds or strands of tobacco filler cut into widths of about 1/10 inch to about 1/60 inch, preferably about 1/20 inch to about 1/35 inch, and in lengths of about 1/4 inch to about 3 inches). The amount of tobacco filler normally used within the tobacco rod of a cigarette ranges from about 0.6 g to about 1 g. The tobacco filler normally is employed so as to fill the tobacco rod at a packing density of about 100 mg/cm$^3$ to about 300 mg/cm$^3$, and often about 150 mg/cm$^3$ to about 275 mg/cm$^3$. Tobacco and other materials 16 useful for forming a smoking article can vary and are described in greater detail below.

In various implementations, the substrate material may comprise a tobacco material, a non-tobacco material, or a combination thereof. In one implementation, for example, the substrate material may comprise a blend of flavorful and aromatic tobaccos in cut filler form. In another implementation, the substrate material may comprise a reconstituted tobacco material, such as described in U.S. Pat. No. 4,807,809 to Pryor et al.; U.S. Pat. No. 4,889,143 to Pryor et al. and U.S. Pat. No. 5,025,814 to Raker, the disclosures of which are incorporated herein by reference in their entirety. Additionally, a reconstituted tobacco material may include a reconstituted tobacco paper for the type of cigarettes described in Chemical and Biological Studies on New Cigarette Prototypes that Heat Instead of Burn Tobacco, R.

J. Reynolds Tobacco Company Monograph (1988), the contents of which are incorporated herein by reference in its entirety. For example, a reconstituted tobacco material may include a sheet-like material containing tobacco and/or tobacco-related materials. As such, in some implementations, the substrate material may be formed from a wound roll of a reconstituted tobacco material. In another implementation, the substrate material may be formed from shreds, strips, and/or the like of a reconstituted tobacco material. In another implementation, the tobacco sheet may comprise overlapping layers (e.g., a gathered web), which may, or may not, include heat conducting constituents. Examples of substrate portions that include a series of overlapping layers (e.g., gathered webs) of an initial substrate sheet formed by the fibrous filler material, aerosol forming material, and plurality of heat conducting constituents are described in U.S. patent application Ser. No. 15/905,320, filed on Feb. 26, 2018, and titled Heat Conducting Substrate for Electrically Heated Aerosol Delivery Device, which is incorporated herein by reference in its entirety.

In some implementations, the substrate material may include a plurality of microcapsules, beads, granules, and/or the like having a tobacco-related material. For example, a representative microcapsule may be generally spherical in shape, and may have an outer cover or shell that contains a liquid center region of a tobacco-derived extract and/or the like. In some implementations, one or more of the substrate materials may include a plurality of microcapsules each formed into a hollow cylindrical shape. In some implementations, one or more of the substrate materials may include a binder material configured to maintain the structural shape and/or integrity of the plurality of microcapsules formed into the hollow cylindrical shape.

Tobacco employed in one or more of the substrate materials may include, or may be derived from, tobaccos such as flue-cured tobacco, burley tobacco, Oriental tobacco, Maryland tobacco, dark tobacco, dark-fired tobacco and *Rustica* tobacco, as well as other rare or specialty tobaccos, or blends thereof. Various representative tobacco types, processed types of tobaccos, and types of tobacco blends are set forth in U.S. Pat. No. 4,836,224 to Lawson et al.; U.S. Pat. No. 4,924,888 to Perfetti et al.; U.S. Pat. No. 5,056,537 to Brown et al.; U.S. Pat. No. 5,159,942 to Brinkley et al.; U.S. Pat. No. 5,220,930 to Gentry; U.S. Pat. No. 5,360,023 to Blakley et al.; U.S. Pat. No. 6,701,936 to Shafer et al.; U.S. Pat. No. 6,730,832 to Dominguez et al.; U.S. Pat. No. 7,011,096 to Li et al.; U.S. Pat. No. 7,017,585 to Li et al.; U.S. Pat. No. 7,025,066 to Lawson et al.; U.S. Pat. App. Pub. No. 2004/0255965 to Perfetti et al.; PCT Pub. No. WO 02/37990 to Bereman; and Bombick et al., *Fund. Appl. Toxicol.,* 39, p. 11-17 (1997); the disclosures of which are incorporated herein by reference in their entireties.

In still other implementations of the present disclosure, the substrate material may include an extruded structure that includes, or is essentially comprised of a tobacco, a tobacco related material, glycerin, water, and/or a binder material, although certain formulations may exclude the binder material. In various implementations, suitable binder materials may include alginates, such as ammonium alginate, propylene glycol alginate, potassium alginate, and sodium alginate. Alginates, and particularly high viscosity alginates, may be employed in conjunction with controlled levels of free calcium ions. Other suitable binder materials include hydroxypropylcellulose such as Klucel H from Aqualon Co.; hydroxypropylmethylcellulose such as Methocel K4MS from The Dow Chemical Co.; hydroxyethylcellulose such as Natrosol 250 MRCS from Aqualon Co.; microcrystalline cellulose such as Avicel from FMC; methylcellulose such as Methocel A4M from The Dow Chemical Co.; and sodium carboxymethyl cellulose such as CMC 7HF and CMC 7H4F from Hercules Inc. Still other possible binder materials include starches (e.g., corn starch), guar gum, carrageenan, locust bean gum, pectins and xanthan gum. In some implementations, combinations or blends of two or more binder materials may be employed. Other examples of binder materials are described, for example, in U.S. Pat. No. 5,101,839 to Jakob et al.; and U.S. Pat. No. 4,924,887 to Raker et al., each of which is incorporated herein by reference in its entirety. In some implementations, the aerosol forming material may be provided as a portion of the binder material (e.g., propylene glycol alginate). In addition, in some implementations, the binder material may comprise nanocellulose derived from a tobacco or other biomass.

In some implementations, the substrate material may include an extruded material, as described in U.S. Pat. App. Pub. No. 2012/0042885 to Stone et al., which is incorporated herein by reference in its entirety. In yet another implementation, the substrate material may include an extruded structure and/or substrate formed from marumarized and/or non-marumarized tobacco. Marumarized tobacco is known, for example, from U.S. Pat. No. 5,105,831 to Banerjee, et al., which is incorporated by reference herein in its entirety. Marumarized tobacco includes about 20 to about 50 percent (by weight) tobacco blend in powder form, with glycerol (at about 20 to about 30 percent weight), calcium carbonate (generally at about 10 to about 60 percent by weight, often at about 40 to about 60 percent by weight), along with binder agents, as described herein, and/or flavoring agents. In various implementations, the extruded material may have one or more longitudinal openings.

In various implementations, the substrate material may take on a variety of conformations based upon the various amounts of materials utilized therein. For example, a sample substrate material may comprise up to approximately 98% by weight, up to approximately 95% by weight, or up to approximately 90% by weight of a tobacco and/or tobacco related material. A sample substrate material may also comprise up to approximately 25% by weight, approximately 20% by weight, or approximately 15% by weight water—particularly approximately 2% to approximately 25%, approximately 5% to approximately 20%, or approximately 7% to approximately 15% by weight water. Flavors and the like (which include, for example, medicaments, such as nicotine) may comprise up to approximately 10%, up to about 8%, or up to about 5% by weight of the aerosol delivery component.

Additionally, or alternatively, the substrate material may include an extruded structure and/or a substrate that includes or essentially is comprised of tobacco, glycerin, water, and/or binder material, and is further configured to substantially maintain its structure throughout the aerosol-generating process. That is, the substrate material may be configured to substantially maintain its shape (e.g., the substrate material does not continually deform under an applied shear stress) throughout the aerosol-generating process. Although such an example substrate material may include liquids and/or some moisture content, the substrate may remain substantially solid throughout the aerosol-generating process and may substantially maintain structural integrity throughout the aerosol-generating process. Example tobacco and/or tobacco related materials suitable for a substantially solid substrate material are described in U.S. Pat. App. Pub. No. 2015/0157052 to Ademe et al.; U.S. Pat. App. Pub. No. 2015/0335070 to Sears et al.; U.S. Pat. No. 6,204,287 to White; and U.S. Pat. No. 5,060,676 to Hearn et al., which are incorporated herein by reference in their entirety.

In some implementations, the amount of substrate material used within the smoking article may be such that the article exhibits acceptable sensory and organoleptic properties, and desirable performance characteristics. For example, in some implementations an aerosol precursor composition such as, for example, glycerin and/or propylene glycol, may be employed within the substrate material in order to provide for the generation of a visible mainstream aerosol that in many regards resembles the appearance of tobacco smoke. For example, the amount of aerosol precursor composition incorporated into the substrate material of the smoking article may be in the range of about 3.5 grams or less, about 3 grams or less, about 2.5 grams or less, about 2 grams or less, about 1.5 grams or less, about 1 gram or less, or about 0.5 gram or less.

According to another implementation, a smoking article according to the present disclosure may include a substrate material comprising a porous, inert material such as, for example, a ceramic material. For example, in some implementations ceramics of various shapes and geometries (e.g., beads, rods, tubes, etc.) may be used, which have various pore morphology. In addition, in some implementations non-tobacco materials, such as an aerosol precursor composition, may be loaded into the ceramics. In another implementation, the substrate material may include a porous, inert material that does not substantially react, chemically and/or physically, with a tobacco-related material such as, for example, a tobacco-derived extract. In addition, an extruded tobacco, such as those described above, may be porous. For example, in some implementations an extruded tobacco material may have an inert gas, such as, for example, nitrogen, that acts as a blowing agent during the extrusion process.

As noted above, in various implementations one or more of the substrate materials may include a tobacco, a tobacco component, and/or a tobacco-derived material that has been treated, manufactured, produced, and/or processed to incorporate an aerosol precursor composition (e.g., humectants such as, for example, propylene glycol, glycerin, and/or the like) and/or at least one flavoring agent, as well as a flame/burn retardant (e.g., diammonium phosphate and/or another salt) configured to help prevent ignition, pyrolysis, combustion, and/or scorching of the substrate material by the heat source. Various manners and methods for incorporating tobacco into smoking articles, and particularly smoking articles that are designed so as to not purposefully burn virtually all of the tobacco within those smoking articles are set forth in U.S. Pat. No. 4,947,874 to Brooks et al.; U.S. Pat. No. 7,647,932 to Cantrell et al.; U.S. Pat. No. 8,079,371 to Robinson et al.; U.S. Pat. No. 7,290,549 to Banerjee et al.; and U.S. Pat. App. Pub. No. 2007/0215167 to Crooks et al.; the disclosures of which are incorporated herein by reference in their entireties.

As noted, in some implementations, flame/burn retardant materials and other additives that may be included within one or more of the substrate materials and may include organo-phosphorus compounds, borax, hydrated alumina, graphite, potassium tripolyphosphate, dipentaerythritol, pentaerythritol, and polyols. Others such as nitrogenous phosphonic acid salts, mono-ammonium phosphate, ammonium polyphosphate, ammonium bromide, ammonium borate, ethanolammonium borate, ammonium sulphamate, halogenated organic compounds, thiourea, and antimony oxides are suitable but are not preferred agents. In each aspect of flame-retardant, burn-retardant, and/or scorch-retardant materials used in the substrate material and/or other components (whether alone or in combination with each other and/or other materials), the desirable properties most preferably are provided without undesirable off-gassing or melting-type behavior.

According to other implementations of the present disclosure, the substrate material may also incorporate tobacco additives of the type that are traditionally used for the manufacture of tobacco products. Those additives may include the types of materials used to enhance the flavor and aroma of tobaccos used for the production of cigars, cigarettes, pipes, and the like. For example, those additives may include various cigarette casing and/or top dressing components. See, for example, U.S. Pat. No. 3,419,015 to Wochnowski; U.S. Pat. No. 4,054,145 to Berndt et al.; U.S. Pat. No. 4,887,619 to Burcham, Jr. et al.; U.S. Pat. No. 5,022,416 to Watson; U.S. Pat. No. 5,103,842 to Strang et al.; and U.S. Pat. No. 5,711,320 to Martin; the disclosures of which are incorporated herein by reference in their entireties. Some casing materials may include water, sugars and syrups (e.g., sucrose, glucose and high fructose corn syrup), humectants (e.g. glycerin or propylene glycol), and flavoring agents (e.g., cocoa and licorice). Those added components may also include top dressing materials (e.g., flavoring materials, such as menthol). See, for example, U.S. Pat. No. 4,449,541 to Mays et al., the disclosure of which is incorporated herein by reference in its entirety. Further materials that may be added include those disclosed in U.S. Pat. No. 4,830,028 to Lawson et al. and U.S. Pat. No. 8,186,360 to Marshall et al., the disclosures of which are incorporated herein by reference in their entireties.

In some implementations, the substrate material may comprise a liquid including an aerosol precursor composition and/or a gel including an aerosol precursor composition. Some examples of liquid compositions can be found in U.S. patent application Ser. No. 16/171,920, filed on Oct. 26, 2018, and titled Aerosol Delivery Device with Visible Indicator, which is incorporated herein by reference in its entirety.

As noted above, in various implementations, one or more of the substrate materials may have an aerosol precursor composition associated therewith. For example, in some implementations the aerosol precursor composition may comprise one or more different components, such as polyhydric alcohol (e.g., glycerin, propylene glycol, or a mixture thereof). Representative types of further aerosol precursor compositions are set forth in U.S. Pat. No. 4,793,365 to Sensabaugh, Jr. et al.; U.S. Pat. No. 5,101,839 to Jakob et al.; PCT WO 98/57556 to Biggs et al.; and Chemical and Biological Studies on New Cigarette Prototypes that Heat Instead of Burn Tobacco, R. J. Reynolds Tobacco Company Monograph (1988); the disclosures of which are incorporated herein by reference. In some aspects, a substrate material may produce a visible aerosol upon the application of sufficient heat thereto (and cooling with air, if necessary), and the substrate material may produce an aerosol that is "smoke-like." In other aspects, the substrate material may produce an aerosol that is substantially non-visible but is recognized as present by other characteristics, such as flavor or texture. Thus, the nature of the produced aerosol may be variable depending upon the specific components of the aerosol delivery component. The substrate material may be chemically simple relative to the chemical nature of the smoke produced by burning tobacco.

In some implementations, the aerosol precursor composition may incorporate nicotine, which may be present in various concentrations. The source of nicotine may vary, and the nicotine incorporated in the aerosol precursor composition may derive from a single source or a combination of two or more sources. For example, in some implementations the aerosol precursor composition may include nicotine derived from tobacco. In other implementations, the aerosol precursor composition may include nicotine derived from other organic plant sources, such as, for example, non-tobacco plant sources including plants in the Solanaceae family. In other implementations, the aerosol precursor composition may include synthetic nicotine. In some implementations, nicotine incorporated in the aerosol precursor composition may be derived from non-tobacco plant sources, such as other members of the Solanaceae family. The aerosol precursor composition may additionally, or alternatively, include other active ingredients including, but not limited to, botanical ingredients (e.g., lavender, peppermint, chamomile, basil, rosemary, thyme, eucalyptus, ginger, cannabis, ginseng, maca, and tisanes), stimulants (e.g., caffeine and guarana), amino acids (e.g., taurine, theanine, phenylalanine, tyrosine, and tryptophan) and/or pharmaceutical, nutraceutical, and medicinal ingredients (e.g., vitamins, such as B6, B12, and C and cannabinoids, such as tetrahydrocannabinol (THC) and cannabidiol (CBD)). It should be noted that the aerosol precursor composition may comprise any constituents, derivatives, or combinations of any of the above.

As noted herein, the aerosol precursor composition may comprise or be derived from one or more botanicals or constituents, derivatives, or extracts thereof. As used herein, the term "botanical" includes any material derived from plants including, but not limited to, extracts, leaves, bark, fibers, stems, roots, seeds, flowers, fruits, pollen, husk, shells or the like. Alternatively, the material may comprise an active compound naturally existing in a botanical, obtained synthetically. The material may be in the form of liquid, gas, solid, powder, dust, crushed particles, granules, pellets, shreds, strips, sheets, or the like. Example botanicals are tobacco, eucalyptus, star anise, hemp, cocoa, cannabis, fennel, lemongrass, peppermint, spearmint, rooibos, chamomile, flax, ginger, Ginkgo biloba, hazel, hibiscus, laurel, licorice (liquorice), matcha, mate, orange skin, papaya, rose, sage, tea such as green tea or black tea, thyme, clove, cinnamon, coffee, aniseed (anise), basil, bay leaves, cardamom, coriander, cumin, nutmeg, oregano, paprika, rosemary, saffron, lavender, lemon peel, mint, juniper, elderflower, vanilla, wintergreen, beefsteak plant, curcuma, turmeric, sandalwood, cilantro, bergamot, orange blossom, myrtle, cassis, valerian, pimento, mace, damien, marjoram, olive, lemon balm, lemon basil, chive, carvi, verbena, tarragon, geranium, mulberry, ginseng, theanine, theacrine, maca, ashwagandha, damiana, guarana, chlorophyll, baobab or any combination thereof. The mint may be chosen from the following mint varieties: *Mentha* Arventis, Mentha c.v., *Mentha niliaca, Mentha piperita, Mentha piperita citrata* c.v., *Mentha piperita* c.v, *Mentha spicata crispa, Mentha* cardifolia, *Mentha longifolia, Mentha suaveolens variegata, Mentha pulegium, Mentha spicata* c.v. and *Mentha suaveolens*.

A wide variety of types of flavoring agents, or materials that alter the sensory or organoleptic character or nature of the mainstream aerosol of the smoking article may be suitable to be employed. In some implementations, such flavoring agents may be provided from sources other than tobacco and may be natural or artificial in nature. For example, some flavoring agents may be applied to, or incorporated within, the substrate material and/or those regions of the smoking article where an aerosol is generated. In some implementations, such agents may be supplied directly to a heating cavity or region proximate to the heat source or are provided with the substrate material. Example flavoring agents may include, for example, vanillin, ethyl vanillin, cream, tea, coffee, fruit (e.g., apple, cherry, strawberry, peach and citrus flavors, including lime and lemon), maple, menthol, mint, peppermint, spearmint, wintergreen, nutmeg, clove, lavender, cardamom, ginger, honey, anise, sage, cinnamon, sandalwood, jasmine, cascarilla, cocoa, licorice, and flavorings and flavor packages of the type and character traditionally used for the flavoring of cigarette, cigar, and pipe tobaccos. Syrups, such as high fructose corn syrup, may also be suitable to be employed.

As used herein, the terms "flavor," "flavorant," "flavoring agents," etc. refer to materials which, where local regulations permit, may be used to create a desired taste, aroma, or other somatosensorial sensation in a product for adult consumers. They may include naturally occurring flavor materials, botanicals, extracts of botanicals, synthetically obtained materials, or combinations thereof (e.g., tobacco, cannabis, licorice (liquorice), hydrangea, eugenol, Japanese white bark magnolia leaf, chamomile, fenugreek, clove, maple, matcha, menthol, Japanese mint, aniseed (anise), cinnamon, turmeric, Indian spices, Asian spices, herb, wintergreen, cherry, berry, red berry, cranberry, peach, apple, orange, mango, clementine, lemon, lime, tropical fruit, papaya, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, betel, shisha, pine, honey essence, rose oil, vanilla, lemon oil, orange oil, orange blossom, cherry blossom, cassia, caraway, cognac, jasmine, ylang-ylang, sage, fennel, wasabi, piment, ginger, coriander, coffee, hemp, a mint oil from any species of the genus Mentha, eucalyptus, star anise, cocoa, lemongrass, rooibos, flax, Ginkgo biloba, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, curcuma, cilantro, myrtle, cassis, valerian, pimento, mace, damien, marjoram, olive, lemon balm, lemon basil, chive, carvi, verbena, tarragon, limonene, thymol, camphene), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, liquid such as an oil, solid such as a powder, or gas.

In some implementations, the flavor comprises menthol, spearmint and/or peppermint. In some embodiments, the flavor comprises flavor components of cucumber, blueberry, citrus fruits and/or redberry. In some embodiments, the flavor comprises eugenol. In some embodiments, the flavor comprises flavor components extracted from tobacco. In some embodiments, the flavor comprises flavor components extracted from cannabis.

In some implementations, the flavor may comprise a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucolyptol, WS-3.

Flavoring agents may also include acidic or basic characteristics (e.g., organic acids, such as levulinic acid, succinic acid, pyruvic acid, and benzoic acid). In some implementations, flavoring agents may be combinable with the elements of the substrate material if desired. Example plant-derived compositions that may be suitable are disclosed in U.S. Pat. No. 9,107,453 and U.S. Pat. App. Pub. No. 2012/0152265 both to Dube et al., the disclosures of which are incorporated herein by reference in their entireties. Any of the materials, such as flavorings, casings, and the like that may be useful in combination with a tobacco material to affect sensory properties thereof, including organoleptic properties, such as described herein, may be combined with the substrate material. Organic acids particularly may be able to be incorporated into the substrate material to affect the flavor, sensation, or organoleptic properties of medicaments, such as nicotine, that may be able to be combined with the substrate material. For example, organic acids, such as levulinic acid, lactic acid, pyruvic acid, and benzoic acid may be included in the substrate material with nicotine in amounts up to being equimolar (based on total organic acid content) with the nicotine. Any combination of organic acids may be suitable. For example, in some implementations, the substrate material may include approximately 0.1 to about 0.5 moles of levulinic acid per one mole of nicotine, approximately 0.1 to about 0.5 moles of pyruvic acid per one mole of nicotine, approximately 0.1 to about 0.5 moles of lactic acid per one mole of nicotine, or combinations thereof, up to a concentration wherein the total amount of organic acid present is equimolar to the total amount of nicotine present in the substrate material. Various additional examples of organic acids employed to produce a substrate material are described in U.S. Pat. App. Pub. No. 2015/0344456 to Dull et al., which is incorporated herein by reference in its entirety.

The selection of such further components may be variable based upon factors such as the sensory characteristics that are desired for the smoking article, and the present disclosure is intended to encompass any such further components that are readily apparent to those skilled in the art of tobacco and tobacco-related or tobacco-derived products. See, Gutcho, Tobacco Flavoring Substances and Methods, Noyes Data Corp. (1972) and Leffingwell et al., Tobacco Flavoring for Smoking Products (1972), the disclosures of which are incorporated herein by reference in their entireties.

In other implementations, the substrate material may include other materials having a variety of inherent characteristics or properties. For example, the substrate material may include a plasticized material or regenerated cellulose in the form of rayon. As another example, viscose (commercially available as VISIL®), which is a regenerated cellulose product incorporating silica, may be suitable. Some carbon fibers may include at least 95 percent carbon or more. Similarly, natural cellulose fibers such as cotton may be suitable, and may be infused or otherwise treated with silica, carbon, or metallic particles to enhance flame-retardant properties and minimize off-gas sing, particularly of any undesirable off-gassing components that would have a negative impact on flavor (and especially minimizing the likelihood of any toxic off-gassing products). Cotton may be treatable with, for example, boric acid or various organo-phosphate compounds to provide desirable flame-retardant properties by dipping, spraying or other techniques known in the art. These fibers may also be treatable (coated, infused, or both by, e.g., dipping, spraying, or vapor-deposition) with organic or metallic nanoparticles to confer the desired property of flame-retardancy without undesirable off-gassing or melting-type behavior.

Smoking articles are manufactured using a cigarette or other smoking article production machine, such as a conventional automated cigarette rod making machine or an aerosol delivery device production line. Example smoking article production machines are of the type commercially available from Molins PLC or Hauni-Werke Korber & Co. KG. For example, cigarette rod making machines of the type known as MkX (commercially available from Molins PLC) or PROTOS (commercially available from Hauni-Werke Korber & Co. KG) can be employed. A description of a PROTOS cigarette making machine is provided in U.S. Pat. No. 4,474,190 to Brand, at col. 5, line 48 through col. 8, line 3, which is incorporated herein by reference. Other types of equipment suitable for the manufacture of various smoking articles are described in U.S. Pat. No. 4,781,203 to La Hue; U.S. Pat. No. 4,844,100 to Holznagel; U.S. Pat. No. 5,156,169 to Holmes et al.; U.S. Pat. No. 5,191,906 to Myracle, Jr. et al.; U.S. Pat. No. 6,647,870 to Blau et al.; U.S. Pat. No. 6,848,449 to Kitao et al.; U.S. Pat. No. 6,904,917 to Kitao et al.; U.S. Pat. No. 7,210,486 to Hartmann; U.S. Pat. No. 7,234,471 to Fitzgerald et al.; U.S. Pat. No. 7,275,548 to Hancock et al.; and U.S. Pat. No. 7,281,540 to Barnes et al.; U.S. Pat. Publ. Nos. 2016/0120213 to Ademe et al; and 2018/0084834 to Ampolini et al.; the disclosures of which are hereby incorporated by reference herein in their entireties.

Various types of smoking article components, including tobacco types, tobacco blends, top dressing and casing materials, blend packing densities; types of paper wrapping materials for tobacco rods, types of tipping materials, and levels of air dilution, can be employed for making smoking article with such automated smoking article production machines. See, for example, the various representative types of smoking article components, as well as the various smoking article designs, formats, configurations and characteristics, which are set forth in U.S. Pat. No. 5,220,930 to Gentry; U.S. Pat. No. 6,779,530 to Kraker; U.S. Pat. No. 7,237,559 to Ashcraft et al.; and 7,565,818 to Thomas et al.; and U.S. Patent Application Publication Nos. 2005/0066986 to Nestor et al.; and 2007/0246055 to Oglesby; each of which is incorporated herein by reference.

Generally, the components and operation of conventional automated smoking article production machines will be readily apparent to those skilled in the art of cigarette making machinery design and operation, given the example equipment disclosed herein. For example, descriptions of the components and operation of several types of chimneys, tobacco filler supply equipment, suction conveyor systems and garniture systems are set forth in U.S. Pat. No. 3,288,147 to Molins et al.; U.S. Pat. No. 3,915,176 to Heitmann et al; U.S. Pat. No. 4,291,713 to Frank; U.S. Pat. No. 4,574,816 to Rudszinat; U.S. Pat. No. 4,736,754 to Heitmann et al. U.S. Pat. No. 4,878,506 to Pinck et al.; U.S. Pat. No. 5,060,665 to Heitmann; U.S. Pat. No. 5,012,823 to Keritsis et al. and 6,360,751 to Fagg et al.; and U.S. Patent Application Publication No. 2003/0136419 to Muller; each of which is incorporated herein by reference.

With such mass-production processes, there may be instances in which at least some of the produced smoking articles may exhibit defects that may render those smoking articles unsaleable. For example, the tobacco rod section (or substrate material) of the smoking article may have a low weight/density, a high weight/density, a soft spot, a hard spot, loose tobacco, or an improper density profile along a length of the tobacco rod section or the substrate. Any of the machines disclosed above can incorporate a density test station, which will preferably be disposed after the tobacco or other smoking material (e.g., an aerosol generating substrate) is deposited on, assembled to, or otherwise provided to an outer warp or housing portion of a smoking article, but before the outer wrap is wrapped or the smoking material otherwise enclosed within the housing. However, in other embodiments, an additional or stand-alone test station can be located proximate to the main manufacturing equipment, such that one or more smoking articles can be transferred for testing and then returned for completion, either manually or via robotic mechanisms, if within acceptable parameters. In some cases, only a sample portion of the smoking articles will be tested for compliance; however, in other cases, every article will be tested.

Figure 2:
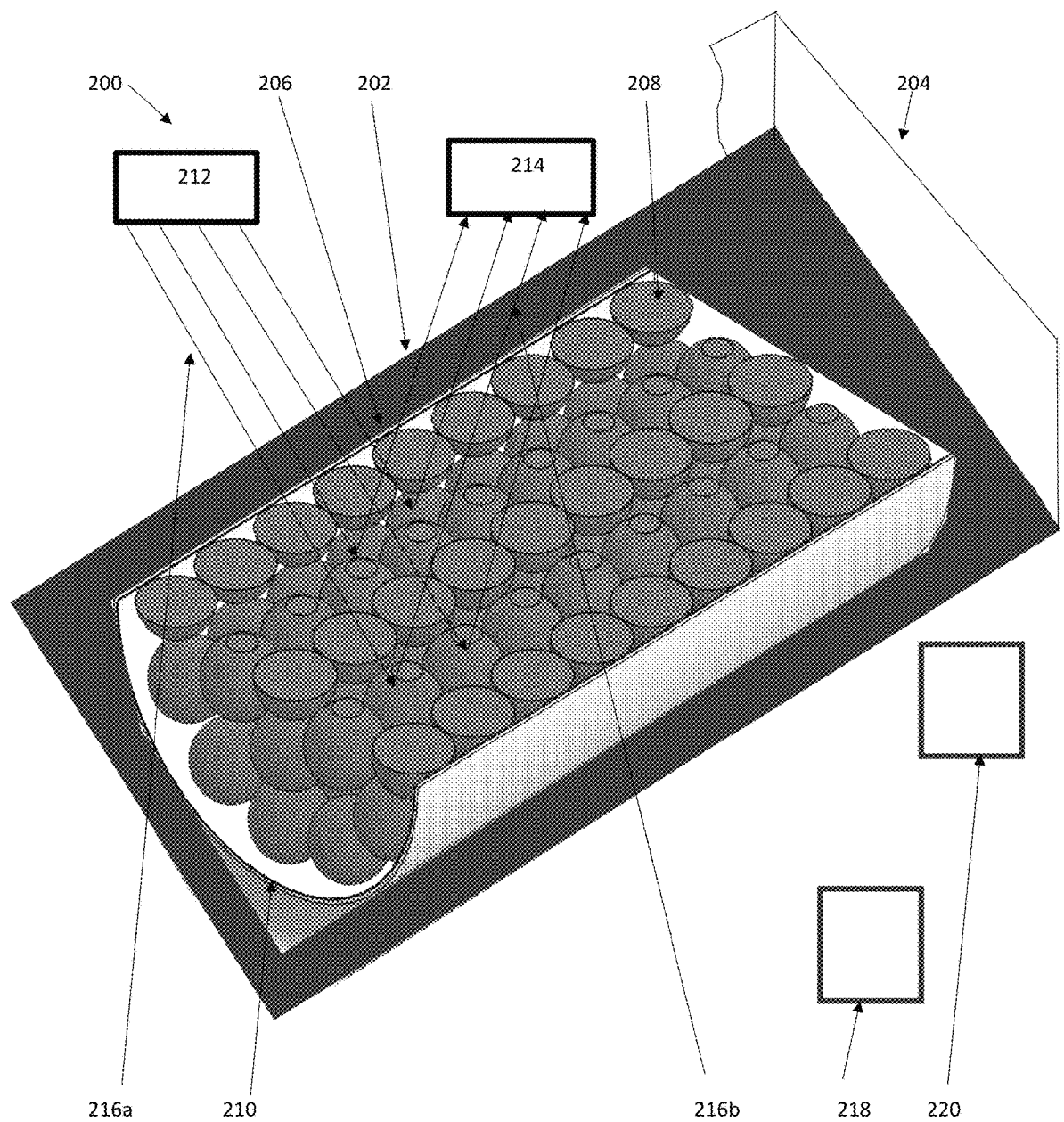
FIG. 2 schematically illustrates a portion of a test station for determining a characteristic of a product for use in a smoking article prior to completing the manufacture of the smoking article in accordance with one or more embodiments of the disclosure.

FIG. 2 depicts a portion of an example test fixture or station 200. Generally, the fixture 200 includes a platform 202 configured for receiving at least a portion of a smoking article 206 and a housing 204 enclosing the platform 202. The size and shape of the fixture 200, and the housing 204 (only partially shown in FIG. 2) in particular, will vary to suit a particular application. The housing 204 will typically include at least one access point for introducing the test sample (i.e., the smoking article 206), such as, for example, a retractable door or the ability to remove and reattach the housing 204 to the platform 202.

As shown in FIG. 2, the fixture 200 also includes a device 212 for generating electromagnetic radiation 216a and a detector 214 for receiving the radiation 216b reflected by the smoking article 206 and/or the platform 202. In certain embodiments, the generating device 212 and the detector 214 are the same device, such as a fixed frequency Gunn oscillator configured to generate and receive microwave energy. In some embodiments, the test fixture 200 is configured to receive a single smoking article 206 for testing, while in others, the fixture 200 may be configured for simultaneously testing multiple smoking articles at one time by, for example, incorporating more than one energy generating device 212 and more than one detector 214 with any necessary shielding or partitions. The housing 204 and the platform 202 are configured such that the electromagnetic radiation 216a emitted by the energy generating device 212 is contained therein. For example, the housing 204 and platform 202 may include material and structures, such as a conductive covering and/or a conductive mesh structure, similar in nature and design to a Faraday shield or cage to prevent the electromagnetic radiation from escaping or leaking out.

In various embodiments, the energy generating device 212 is a microwave radiation emitting device. The energy generating device 212 can, in some aspects, include a magnetron that generates microwave radiation 216a. In some aspects, the magnetron is sized to conform to a desired shape, size, etc., of the test fixture 200 as needed. In other aspects, the energy generating device 212 may include an antenna, coils, transducer, or the like, configured to generate the microwave radiation 216a.

Generally, the microwave radiation 216a emitted by the energy generating device 212 is configured to penetrate at least a portion of the smoking article (e.g., a tobacco containing substrate material 208), but not necessary an outer wrap 210 configured for enclosing the substrate 208 in a finished state, but disposed beneath the substrate 208 in the unfinished article, as shown in FIG. 2. Specifically, a portion of the radiation 216a is absorbed by the substrate 208, while the remaining radiation 216b is reflected by, for example, a foil lined outer wrap 210 and/or the platform 202. The reflected radiation 216b is measured, or otherwise captured, by the detector 214. The fixture 200 also includes a controller 218 and optionally one or more sensors 220. The controller 218 can include a processor or other logic device that transforms the measured data into, for example, a determined density profile.

In some aspects, the energy generating device 212, as well as other aspects of the test fixture 200, are electrically powered by a power source. The power source is configured to provide power, energy, or current flow sufficient to provide various functionalities of the test fixture 200, such as the energy generating device 212, powering of control components or systems, powering of indicators, and any material handling mechanisms or robotics. The power source can take on various embodiments that are each capable of delivering sufficient power to the energy generating device 212 to rapidly provide energy to a test environment defined within the housing 204 and to power other components of the test fixture 200 through use for the desired duration of time. For example, in some instances, the fixture 200 is powered via a standard household outlet (e.g., 120 AC volts). In another example, the fixture 200 is powered by a battery of a sufficient energy density.

The controller 218 can be configured to selectively control the energy generating device 212 to emit microwave radiation 216a at a frequency specific to one or more components of the smoking article 206. One or more sensors 220 can be incorporated within the test fixture 200 and/or in communication therewith to measure and provide feedback with respect to, for example, radiation wavelengths/frequencies, energy transmitted, thermal changes, test duration, energy leakage, test status, etc. The one or more sensors 220 may be in communication with the controller 218, which can be configured to receive a signal such as, for example, an electrical signal from each of the sensor(s). The controller 218 can initiate an operation in response to such signals, such as, for example, starting or stopping the microwave radiation emitting device 212, altering an operational parameter thereof, etc.

Figure 3A:
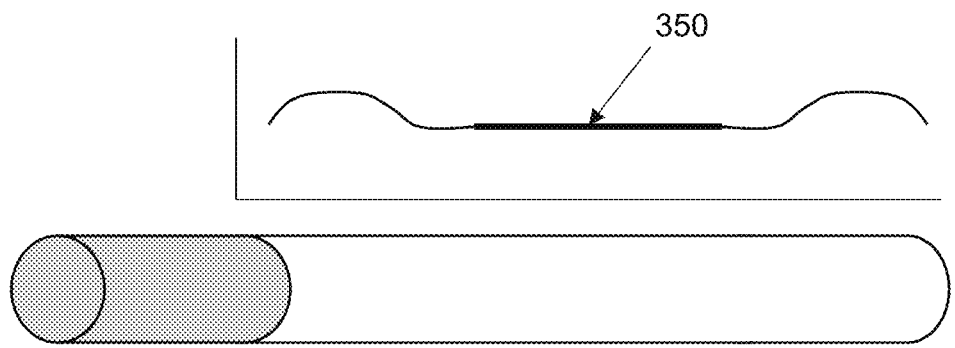
FIG. 3A schematically illustrates an example model density profile of a tobacco material for use in a smoking article.

The test fixture arrangement may be configured in different manners, according to various aspects of the present disclosure. However, in general, the test fixture 200 is configured to determine an overall density or density profile along a length of the tobacco rod section/substrate of the smoking article received by the test fixture, and to compare the determined density and/or density profile to a model density or density profile (350 in FIG. 3A). Any smoking article so tested and having a determined density or density profile deviating from the model density profile, can be rejected and either discarded or returned to the manufacturing process for modification, as the smoking article is tested in an unfinished state. Accordingly, if the determined density or density profile does not deviate from the model, the smoking article can be transferred to a subsequent station in the production equipment or returned to the manufacturing process for completion, as dictated by whether the test fixture is incorporated within the production equipment or a stand-alone system.

Figure 3B:
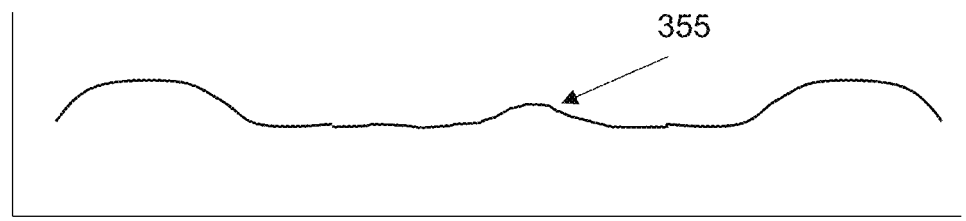
FIGS. 3B and 3C schematically illustrate determined density profiles of the tobacco material of certain defective smoking articles.
Figure 3C:
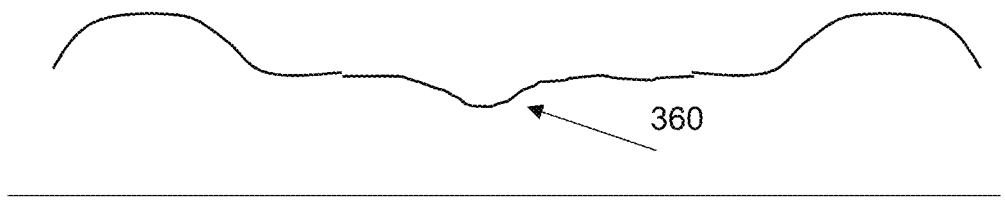

FIGS. 3B and 3C schematically illustrate determined density profiles of a tobacco rod section/substrate demonstrating defective smoking articles. As shown in FIG. 3B, the substrate has a "hard spot" 355 indicated by an increase in density compared to the model density profile, while in FIG. 3C the substrate has a "soft spot" 360 indicated by a decrease in density compared to the model density profile.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method steps or system elements, it should be understood that those steps and those elements may be combined in other ways to accomplish the same objectives.

Furthermore, those skilled in the art should appreciate that the parameters and configurations described herein are example and that actual parameters and/or configurations will depend on the specific application in which the systems and techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto; the disclosure may be practiced other than as specifically described.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

What is claimed is:

1. A method of determining a characteristic of a smoking article, the method comprising:
   providing at least a portion of the smoking article to a test fixture, wherein at least one of the at least a portion of the smoking article or a portion of the test fixture comprises a reflective surface and the test fixture is located proximate an electromagnetic energy generating device;
   transmitting electromagnetic energy comprising microwave radiation from the energy generating device to the at least a portion of the smoking article, wherein the electromagnetic energy is generated via at least one of a magnetron, a klystron, a gyrotron, or a Gunn oscillator; and
   measuring an amount of electromagnetic energy reflected from at least one of the at least a portion of the smoking article or the portion of the test fixture to determine an amount of electromagnetic energy absorbed by the at least a portion of the smoking article, wherein the amount of electromagnetic energy absorbed represents the characteristic, wherein the amount of electromagnetic energy reflected by the at least a portion of the smoking article is measured via a detector.

2. The method of claim 1 further comprising the step of operably engaging a controller element between the electromagnetic energy generating device and a sensing element in communication with the controller, wherein the controller is configured to selectively control the electromagnetic energy generating device to emit electromagnetic energy at a frequency specific to one or more components of the smoking article.

3. The method of claim 1, wherein the smoking article comprises a substrate material deposited on an outer wrap, wherein the outer wrap is in an unwrapped configuration.

4. The method of claim 3, wherein the outer wrap comprises the reflective surface.

5. The method of claim 4, wherein the reflective surface comprises a foil substrate.

6. The method of claim 1, wherein providing the at least a portion of the smoking article to a test fixture comprises:
   removing the at least a portion of the smoking article from a production machine; and
   securing the at least a portion of the smoking article to the test fixture.

7. The method of claim 1, wherein providing the at least a portion of the smoking article to a test fixture comprises transferring the at least a portion of the smoking article to a test station within a production machine.

8. The method of claim 1, wherein the characteristic to be determined is the density of a material used in the smoking article.

9. The method of claim 1, wherein the test fixture has a platform configured for receiving the at least a portion of the smoking article.

10. The method of claim 9, wherein the platform is the reflective surface of the test fixture and comprises a material that is impervious to the electromagnetic energy.

11. The method of claim 10, wherein the platform is contoured to optimize a direction in which the electromagnetic energy is reflected.

12. The method of claim 1, wherein the test fixture comprises a housing incorporating the electromagnetic energy generating device and configured to contain the electromagnetic energy within the test fixture.

13. The method of claim 1, wherein a position of the detector relative to the test fixture is adjustable.

14. The method of claim 1, wherein the electromagnetic radiation is delivered at a frequency of about 300 MHz to about 300 GHz.

15. A testing system for determining a characteristic of a smoking article, the system comprising:
   a test fixture comprising:
      a platform configured for receiving at least a portion of the smoking article, wherein the at least a portion of the smoking article comprises a material deposited on an outer wrap, wherein the outer wrap is in an unwrapped configuration; and
      a housing coupled to and substantially enclosing the platform, wherein the housing defines a testing environment and is configured to provide access to the platform;
   an electromagnetic energy generating device coupled to the housing, the device configured to deliver microwave radiation to the testing environment, wherein the electromagnetic energy is directed towards the at least a portion of the smoking article; and
   a detector coupled to the housing, the detector configured for measuring reflected electromagnetic energy, wherein the reflected electromagnetic energy is reflected from at least one of the at least a portion of the smoking article or the platform.

16. The system of claim 15, wherein the testing system is incorporated into a machine for manufacturing a smoking article.

17. The system of claim 15, wherein the electromagnetic energy generating device generates microwaves via at least one of a magnetron, a klystron, a gyrotron, or a Gunn oscillator.

18. The system of claim 15 further comprising a controller operably engaged with the electromagnetic energy generating device and the detector, wherein the controller is configured to selectively control the electromagnetic energy generating device to emit electromagnetic energy at a frequency specific to one or more components of the smoking article.

19. The system of claim 18, wherein the controller comprises a processor and the processor is configured to determine an amount of electromagnetic energy absorbed by the at least a portion of the smoking article, wherein the amount of electromagnetic energy absorbed represents the characteristic.

20. The system of claim 19, wherein the characteristic comprises a density of the material.

21. The system of claim 15, wherein the platform comprises a material that is impervious to the electromagnetic energy and is contoured to optimize a direction in which the electromagnetic energy is reflected.

\* \* \* \* \*